United States Patent
Abu Zaki et al.

(10) Patent No.: US 10,102,845 B1
(45) Date of Patent: Oct. 16, 2018

(54) INTERPRETING NONSTANDARD TERMS IN LANGUAGE PROCESSING USING TEXT-BASED COMMUNICATIONS

(71) Applicant: Amazon Technologies, Inc., Reno, NV (US)

(72) Inventors: Weam Abu Zaki, Seattle, WA (US); Ying Shi, Seattle, WA (US); Rajiv Ramachandran, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 334 days.

(21) Appl. No.: 13/776,594

(22) Filed: Feb. 25, 2013

(51) Int. Cl.
  *G10L 15/00* (2013.01)

(52) U.S. Cl.
  CPC ................... *G10L 15/00* (2013.01)

(58) Field of Classification Search
  CPC ........................................... G10L 15/00
  USPC ........................................ 704/9, 257, 275
  See application file for complete search history.

(56) References Cited

U.S. PATENT DOCUMENTS

| | | | | |
|---|---|---|---|---|
| 5,748,191 A * | 5/1998 | Rozak | ........................ | G06F 3/16 704/E15.04 |
| 6,598,018 B1 * | 7/2003 | Junqua | ..................... | G10L 15/22 704/231 |
| 6,751,591 B1 * | 6/2004 | Gorin | ....................... | G10L 15/22 379/88.01 |
| 7,590,536 B2 * | 9/2009 | Bates | ..................... | G10L 15/197 704/231 |
| 8,346,563 B1 * | 1/2013 | Hjelm | .................. | G10L 15/1822 379/88.01 |
| 8,370,147 B2 * | 2/2013 | Kennewick | ......... | G06Q 30/0261 704/257 |
| 9,035,884 B2 * | 5/2015 | Phillips | .................. | G06F 17/275 341/22 |
| 2007/0038436 A1 * | 2/2007 | Cristo | .................... | G06F 17/273 704/9 |
| 2008/0091406 A1 * | 4/2008 | Baldwin | .................. | G10L 15/22 704/4 |
| 2008/0243486 A1 * | 10/2008 | Summitt | ............. | G06F 17/2735 704/10 |
| 2009/0144609 A1 * | 6/2009 | Liang | ..................... | G06F 17/278 715/230 |
| 2009/0204596 A1 * | 8/2009 | Brun | ...................... | G06F 17/278 |
| 2011/0301955 A1 * | 12/2011 | Byrne | ..................... | G10L 15/22 704/251 |

(Continued)

FOREIGN PATENT DOCUMENTS

JP   2004012653 A   *   1/2004
JP   2004012653 A   *   1/2004

*Primary Examiner* — Walter Yehl
(74) *Attorney, Agent, or Firm* — Knobbe, Martens, Olson & Bear, LLP (57) ABSTRACT

Features are disclosed for determining a definition or value of a nonstandard term. A user utterance may be processed into one or more candidate transcriptions. An interpretation of the utterance can be generated from the transcriptions. If the transcription includes a word, phrase, or term that is not recognized or is used in a nonstandard way, one or more data stores may be queried regarding the proper value or definition of the term. If a definition or value is not available in the data stores, the user may be prompted to provide one. The user-supplied definition can be saved for future use, and may be used as a general definition of the term for other users.

32 Claims, 5 Drawing Sheets

(56) References Cited

U.S. PATENT DOCUMENTS

2014/0108018 A1* 4/2014 Phillips ............... G06F 17/275
704/275
2014/0129222 A1* 5/2014 Okamoto ............. G10L 15/06
704/243

* cited by examiner

INTERPRETING NONSTANDARD TERMS IN LANGUAGE PROCESSING USING TEXT-BASED COMMUNICATIONS

BACKGROUND

Spoken language processing systems include various modules and components for receiving speech input from a user, determining what the user said, and determining what the user meant. In some implementations, a spoken language processing system includes an automatic speech recognition ("ASR") module that receives audio input of a user utterance and generates one or more likely transcriptions of the utterance. Spoken language processing systems may also include a natural language understanding ("NLU") module that receives input, such as a transcription of a user utterance generated by the ASR module, and determines the meaning of the input in a way that can be acted upon, such as by a computer application.

An NLU module can identify particular words (e.g., named entities) in the transcription. Based on those named entities, the NLU module can identify a user's intent, and generate an output that may be used by an application to respond or otherwise perform an action regarding the user's intent. For example, a user of a mobile phone may issue a spoken command to play a particular song. Audio of the spoken command can be processed and transcribed by the ASR module, and the NLU module can determine the user's intent from the transcription (e.g., that the user wants to initiate playback of a song) and initiate playback of the song.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Spoken language processing systems can process audio data of spoken user input into one or more possible transcriptions of what the user said. Spoken language processing systems can then identify the meaning of what the user said in order to take some action in response to the spoken input from the user. In some spoken language processing systems, an automatic speech recognition ("ASR") module may utilize various models (e.g., language models, acoustic models) to determine the content of a spoken user interaction, also known as an utterance. Other modules, such as a natural language understanding ("NLU") module, may interpret the user's words as determined by the ASR module to identify a likely interpretation of the user's intent (e.g., an action the user would like to initiate). The NLU module can identify certain terminology, also known as named entities, in the user utterance that can aid in determining the user's intent.

The NLU module can be trained or otherwise configured to recognize words and phrases and categorize them as particular named entities. However, when an NLU module encounters a word that it has not been trained to recognize or categorize as a particular named entity (such as a made-up word that is not in any dictionary), the NLU module may experience an error or produce invalid results. An NLU module may experience similar issues when it encounters a word or phrase that is used in an unexpected manner (such as a user-specific slang term), or when it encounters a term that has a variable value or definition depending upon the user (e.g., "my hometown" may be the city in which a user currently lives, the city in which the user was raised, the city in which the user was born, etc.).

Aspects of this disclosure relate to identifying variable and unknown terminology in textual input and obtaining a definition or meaning for the terminology. The definition (e.g., an alias or named entity classification) may then be used to generate an interpretation of the textual input. For example, an NLU module may receive input from an ASR module. The input may include a transcription of a user utterance, including one or more unknown terms (e.g., terms that the spoken language processing system does not recognize) or variable terms (e.g., recognized terms for which the meaning depends upon the user, such as "my hometown," or terms to which a user has attached a meaning that differs from a standard meaning, such as slang terms and nicknames). Such terms may collectively be referred to as nonstandard terms. When the NLU module processes the transcription, it may be unable to categorize the nonstandard terms as particular named entities or other indicators of user intent).

The NLU module can obtain a definition for the nonstandard terms from user-specific data (e.g., a glossary of personalized or user-created terms and associated definitions), shared definition data (e.g., a glossary of commonly used non-standard terms and associated definitions, in some cases based on demographic information or other characteristics of the user), unstructured data, and the like. If a satisfactory definition is obtained, the NLU module can proceed to generate an interpretation of the text. If a satisfactory definition is not obtained, the user may be prompted to provide one, or the NLU module may make a guess as to the meaning or named entity classification of the term and proceed to process the input according to that guess. The NLU module can then track any feedback or subsequent utterances made by the user that may indicate the term's meaning (e.g., a user may say "no, I meant . . . " when the NLU module is wrong).

Additional aspects of the disclosure relate to determining definitions for particular types of nonstandard terms, such as terms that have variable definitions depending upon the user. For example, a user (or group of users sharing some characteristic, such as geographic location, age, gender, ethnicity, and the like) may use a term of endearment for the user's spouse. Other users may use the same term for a parent or child. A spoken language processing system may experience errors or produce invalid results if it resolves the value of the term by identifying the spouse of the user for each user that uses that term. When an NLU module encounters a variable term during processing of text input, the NLU module can obtain the user-specific definition for the term from a user data store of definitions associated with such known variable terms. If there is no user-specific definition for the variable, the NLU module may prompt the user or continue processing the input using a generally accepted relationship to determine the definition (e.g., that a particular term of endearment is generally used for spouses, and the NLU module has access to the identity of the user's spouse).

Aspects of the embodiments described in the disclosure will focus, for the purpose of illustration, on a client device that transmits data to a networked spoken language processing system for processing. However, the systems and techniques described herein may be implemented on a single device, such as a user device that both receives spoken input and processes the input to determine the user's intent. Various aspects of the disclosure will now be described with regard to certain examples and embodiments, which are intended to illustrate but not limit the disclosure.

Figure 1:
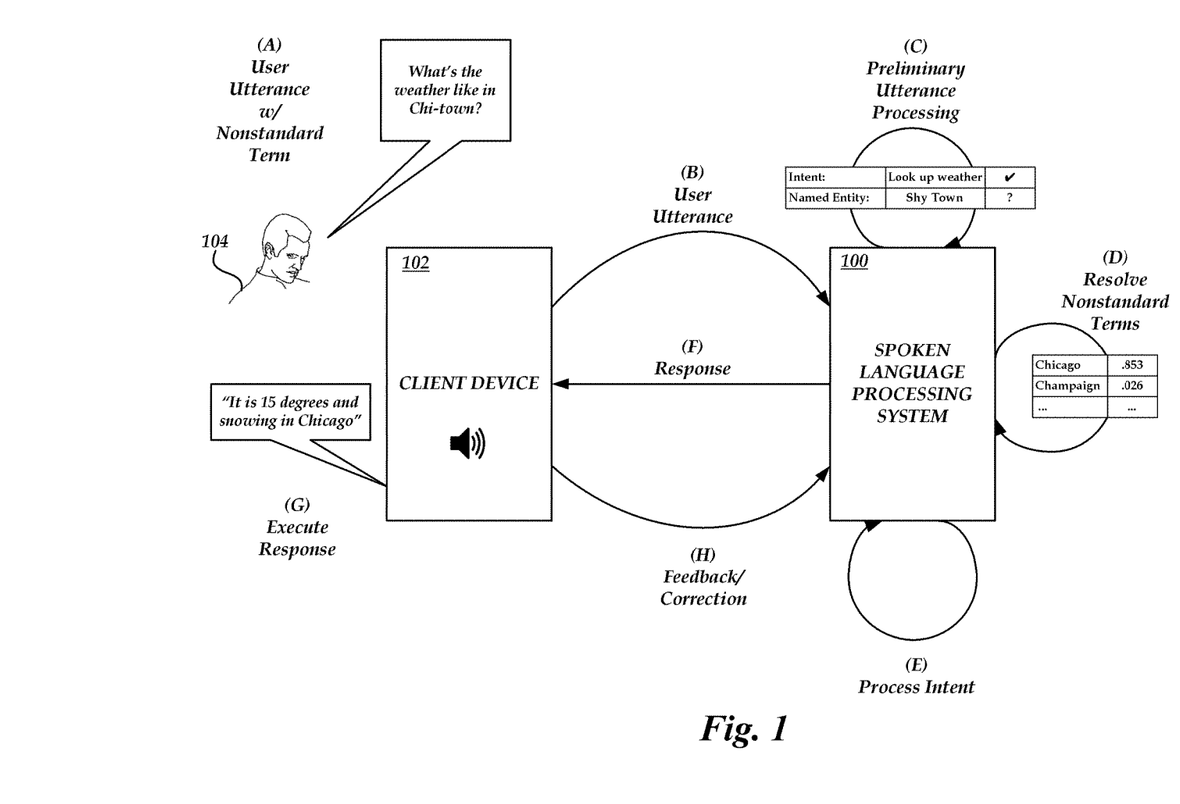
FIG. 1 is a block diagram of illustrative interactions between a spoken language processing system, a client device, and a user when processing an utterance that includes nonstandard terms.

With reference to an illustrative example, a user may issue spoken commands or otherwise make spoken utterances to a client device, such as a mobile phone or tablet computer. The utterances may be transmitted to a network-accessible spoken language processing system, which processes the utterances and takes some action in response. FIG. 1 illustrates such interactions between a spoken language processing system 100 and a client device 102.

As seen in FIG. 1, a user 104 may make an utterance to a client device 102 at (A). The utterance may include a nonstandard term. In the example, the utterance is "What's the weather like in Chi-town?" The nonstandard term is "Chi-town," a nickname or slang term for the city of Chicago, Ill.

Audio data of the utterance may be transmitted to the spoken language processing system 100 at (B). The spoken language processing system 100 illustrated in FIG. 1 may include an ASR module to process the utterance and transcribe what the user said. The ASR module can output one or more likely transcriptions. For example, the ASR module 102 may output a lattice or N-best list of likely transcriptions, with a most likely transcription of "What's the weather like in Shy Town." Note the phonetic spelling of the city name. When a nonstandard term is used, the ASR module may not be able to determine an accurately spelled transcription of the term, and therefore a phonetic spelling may be used in the results. In some embodiments, the ASR module may provide a phoneme sequence or soundex interpretation rather than a phonetic spelling.

At (C), the spoken language processing system 100 may use an NLU module to categorize terms as particular named entities that are useful in interpreting the ASR output. Some named entities indicate a particular action that is to be taken or triggered; these named entities may be referred to as trigger entities or intents. The NLU module may determine that the phrase "What's the weather like" corresponds to a user intent of "Look up weather." This user intent is typically associated with a named entity of type "city" or some other location indicator (e.g., a place for which the weather is to be retrieved). The NLU module may determine the part of speech of various words or terms to help in identifying the place for which the weather is to be retrieved. For example, the NLU module may determine that the term "Shy Town" is a noun, or more specifically, that it corresponds to a place. The NLU module may use this determination in an effort to identify which terms of the transcription might be the place for which the weather is to be retrieved. However, "Shy Town" is not a location about which the spoken language processing system 100 may determine the weather because it is not the name of an actual city. The NLU module may then attempt to resolve the term "Shy Town" as a known location by obtaining a definition for the term. The definition may be user-supplied, retrieved from a knowledge base or unstructured data search, etc.

In some embodiments, the NLU module may associate a binary flag with each intent or other named entity indicating whether the term is a known term such that the NLU module can reliably define or interpret it. In some embodiments, the NLU module may associate a confidence score with each named entity. In either case, only intents and other named entities flagged as a known term or associated with confidence scores exceeding a threshold may be considered satisfactory. If a named entity is associated with a confidence score that fails to meet a threshold (e.g., in FIG. 1, the phrase "Shy Town" as a place) or is not flagged as a known term, the definition may be considered to be nonstandard.

The spoken language processing system 100 may attempt to resolve the nonstandard term at (D). For example, having identified the nonstandard term "Shy Town" as likely relating to a location, the spoken language processing system 100 may query a knowledge base or other data store for actual locations that correspond to the nonstandard term. If the term is a known word that has been used in an unexpected way, the spoken language processing system 100 may search for the term using the text of the term. However, if the term is not found in the dictionary of words available to the spoken language processing system 100 or is otherwise a term that the spoken language processing system 100 has not been trained to recognize, a phonetic search may be performed. The phonetic search may be performed with the phonetic spelling of the word, a soundex interpretation of the word, the sequence of phonemes that make up the word, etc. For example, the data store may index at least a portion of the values therein based on a sequence of phonemes that make up the terms instead of, or in addition to, the text value of the term. The data store can then locate relevant results based on a phoneme sequence received from the NLU module or some other component.

The data store may access any number of records regarding the likely definition of the slang term that sounds like "Shy Town," and can retrieve a result. In the present example, the data store may return a result indicating that the most likely definition is "Chicago," based on one or more records that indicate the term "Shy Town" (or the sequence of phonemes that represent the term) is slang for Chicago. If the data store returns multiple results, a confidence score may be associated with each result based on how widely accepted the definition is for the nonstandard term, how closely the nonstandard term as spoken by the user corresponds to the results, or other factors. The spoken language processing system 100 can choose the most likely definition based on the scores.

The spoken language processing system 100 can process the user's intent at (E). For example, the spoken language processing system 100 can retrieve data regarding the weather in Chicago. Based on the retrieved data, the spoken language processing system 100 can then transmit a response to the client device 102 at (F). For example, if the weather is to be presented to the user visually, data and/or graphics may be generated and transmitted to the client device 102. If the weather is to be presented audibly, a text-to-speech (TTS) component may be used to generate synthesized speech for playback on the client device 102.

At (G), the client device 102 can execute the response received from the spoken language processing system 100. In the example of FIG. 1, the client device 102 can present TTS audio to the user describing the current weather in Chicago. In some cases, the response received from the spoken language processing system 100 may not be audio, such as when textual or graphical data is provided to the client device 102. In those cases, the response can be visually presented to the user on a display associated with the client device 102. In some embodiments, no audiovisual output is sent to the client device 100. For example, a command may be sent to the client device 102, such as when the user requests to initiate a phone call. In that case, data or an executable command may be provided to the client device 102 so that the client device 102 can initiate a phone call. In some embodiments, there is no interactive response that is sent back to the client device 102. For example, if the user requests to set up a reminder, then a reminder can be generated. However, no response may be required, particularly when the reminder is saved at a location other than the client device 102.

At (H), user feedback or corrections may be transmitted back to the spoken language processing system 100. The feedback may relate to the accuracy of the nonstandard term resolution performed by the spoken language processing system 100. For example, the user 104 may have had a different city in mind when using the term "Chi-town," such as Chillicothe, Ohio rather than Chicago, Ill. In this case, the user may, upon hearing the weather for Chicago at (G), speak, type, or otherwise indicate that the user in fact wanted the weather for Chillicothe, Ohio when the user asked "What's the weather like in Chi-town?" That feedback may be processed by some module or component of the spoken language processing system 100 such that the next time the user 104 uses the nonstandard term "Chi-town," the system 100 interprets that term as Chillicothe, Ohio.

For example, a data store may be updated to indicate that this user 104 uses "Chi-town" as an alias for Chillicothe, Ohio. During subsequent processing by the spoken language processing system 100, that data store may be consulted and the personalized definition for the nonstandard term may be accessed. In some cases, the personalized definition may be accessed in addition to other candidate definitions, such as Chicago, Ill. Each result may be ranked or associated with a particular score. For this particular user 104, the result corresponding to Chillicothe, Ohio may be ranked higher or given a higher score than the result corresponding to Chicago, Ill. For other users, the result from Chicago, Ill. may continue to be ranked higher or given a higher score, or the result corresponding to Chillicothe, Ohio may not be obtained at all.

Figure 2:
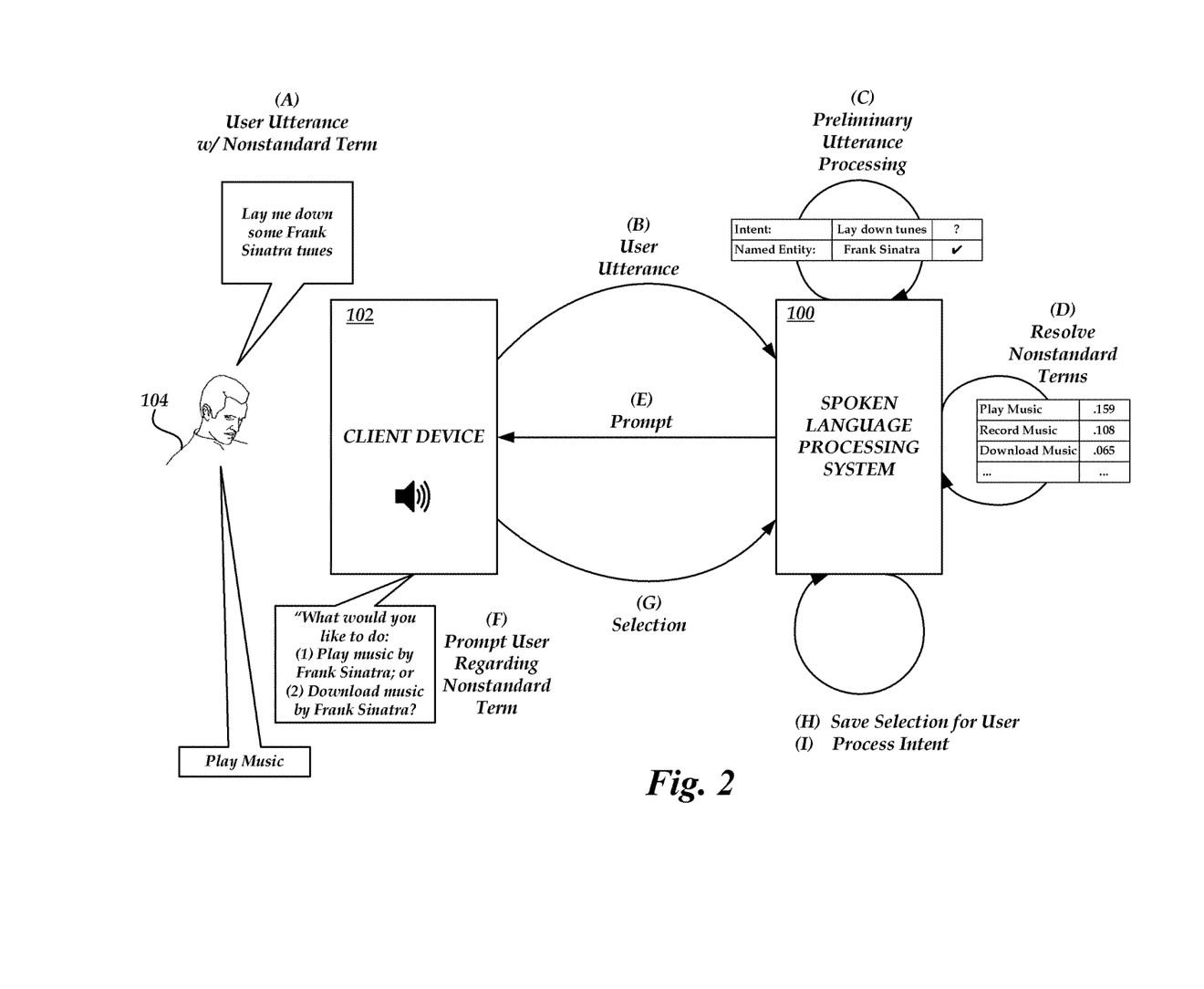
FIG. 2 is a block diagram of additional illustrative interactions between a spoken language processing system, a client device, and a user when processing an utterance that includes nonstandard terms.

Turning now to FIG. 2, interactions between a client device 102 and a spoken language processing system 100 are illustrated, such as those that may occur when a satisfactory definition or value of the nonstandard term is not located in a data store. In the example of FIG. 2, a user 104 makes the user utterance "Lay me down some Frank Sinatra tunes" at (A). The client device 102 can transmit audio data of the user utterance to the spoken language processing system 100 at (B).

An NLU module can receive a transcription or N-best list of transcriptions for processing, such as those generated by an ASR module. The NLU module may then initiate processing of the transcriptions at (C) to determine the user intent. The NLU module can label or tag individual words or phrases as named entities that may provide data important in determining the user intent and initiating a response or other action, as described above. When encountering words or phrases that the NLU module is unfamiliar with, or when encountering familiar words used in unfamiliar contexts, the NLU module may begin to analyze the words or phrases to assign them to a named entity. Part of the analysis may include considering the part of speech of the words, or a category for the words (e.g., person, place, thing, etc.). In the present example, the phrase "Lay me down" includes a verb and is the predicate of the sentence. This can indicate that the phrase represents the user's intent. The word "tunes" is a noun, and the NLU module may determine that it relates to music. For example, the NLU module may have access to a dictionary or data store defining the term "tunes," or the NLU module may be trained to process transcriptions related to music (e.g., in the music domain) and therefore it may recognize that the term "tunes" refers to songs. However, the NLU module may not know the meaning of the phrase "lay me down" in the music domain even though each of the words is in a standard dictionary and even though the phrase is associated with one or more reasonable interpretations based on the standard dictionary definitions of the terms.

At (D), the spoken language processing system 100 can attempt to resolve the nonstandard term "lay me down some tunes," e.g., by querying a knowledge base or other data store as described above. In this case, however, a clear definition of "lay me down," as the phrase relates to music, may not be available. For example, the knowledge base may return a list of possible results and associated confidence scores, including top results "play music," "record music," and "download music." Scores associated with the top results may not indicate a clearly accepted definition. The NLU module may determine that it cannot define the nonstandard term on its own, and therefore a user prompt may be used. In some embodiments, the NLU module may select the highest scoring result (or some other result) even though the results are ambiguous. The NLU module and the rest of the spoken language processing system 100 may proceed using the selected result, and may monitor subsequent interactions from the user to determine whether it was the incorrect result (e.g., the user immediately submits the same or a similar request, or indicates that the response from the spoken language processing system is incorrect). If there is no correction received from the user, the spoken language processing system 100 may assume that the result was the correct one, and can store or update the chosen result accordingly so that it may be used in the further with a greater degree of confidence.

At (E), a user prompt is generated and transmitted to the client device 102. The user prompt may be a visual prompt (e.g., a popup message box), an audio prompt (e.g., TTS audio), or some combination thereof. In some embodiments, the spoken language processing system 100 may use the part of speech of the nonstandard term in generating the prompt. For example, if it has determined that "tunes" relates to music and the nonstandard term "lay me down" is a verb that in some way indicates what the user wants to do with the music, the spoken language processing system 100 can generate a specific prompt (e.g., "Would you like to play music or download music") rather than a more general question (e.g., "What does 'lay me down' mean?").

The example of FIG. 2 shows an audio prompt at (F) of selected results for "lay me down" in the context of music. The user 104 can then indicate which option is the correct option, and the selection can be transmitted to the spoken language processing system 100 at (G).

At (H), the spoken language processing system 100 can save the selection for the user. The spoken language processing system 100 may maintain or have access to a data store of user-specific data. A record may be added to the user-specific data score indicating that for this particular user, the phrase "lay me down some tunes" is an alias for or otherwise means "play music." As a result, the next time the user submits an utterance with the phrase "lay me down some tunes," even if a different artist is specified (e.g., someone other than Frank Sinatra, the artist specified in the original user utterance), the spoken language processing system 100 can determine the correct user intent without requiring another user prompt. For example, a sequence of interactions similar to those illustrated in FIG. 1 may occur, and the definition "play music" may be returned from the data store at (D) when the NLU module attempts to resolve nonstandard terms.

In some embodiments, the user-specific data stores for multiple users may be queried for similar definitions to the nonstandard term for which a definition was stored for this user. If the term has been defined similarly for more than a threshold number of users, the term may be considered to be a standard or general term. In such cases, records may be stored in a shared data store or integrated into the NLU module so that the definition may be easily applied to subsequent requests that include the term, regardless of the user. For example, if 10, 100, or 1000 users use the phrase "lay me down some tunes" to mean "play music," then the phrase may be added to the shared data store such that any subsequent user may use the phrase when requesting music to be played.

At (I), the spoken language processing system 100 can process the user intent. For example, the spoken language processing system 100 may generate a command that is sent to the client device 102 to play Frank Sinatra music that is stored locally. In some embodiments, the spoken language processing system 100 may cause a music streaming system to begin streaming Frank Sinatra music to the client device 100.

Distributed Spoken Language Processing System Environment

Figure 3:
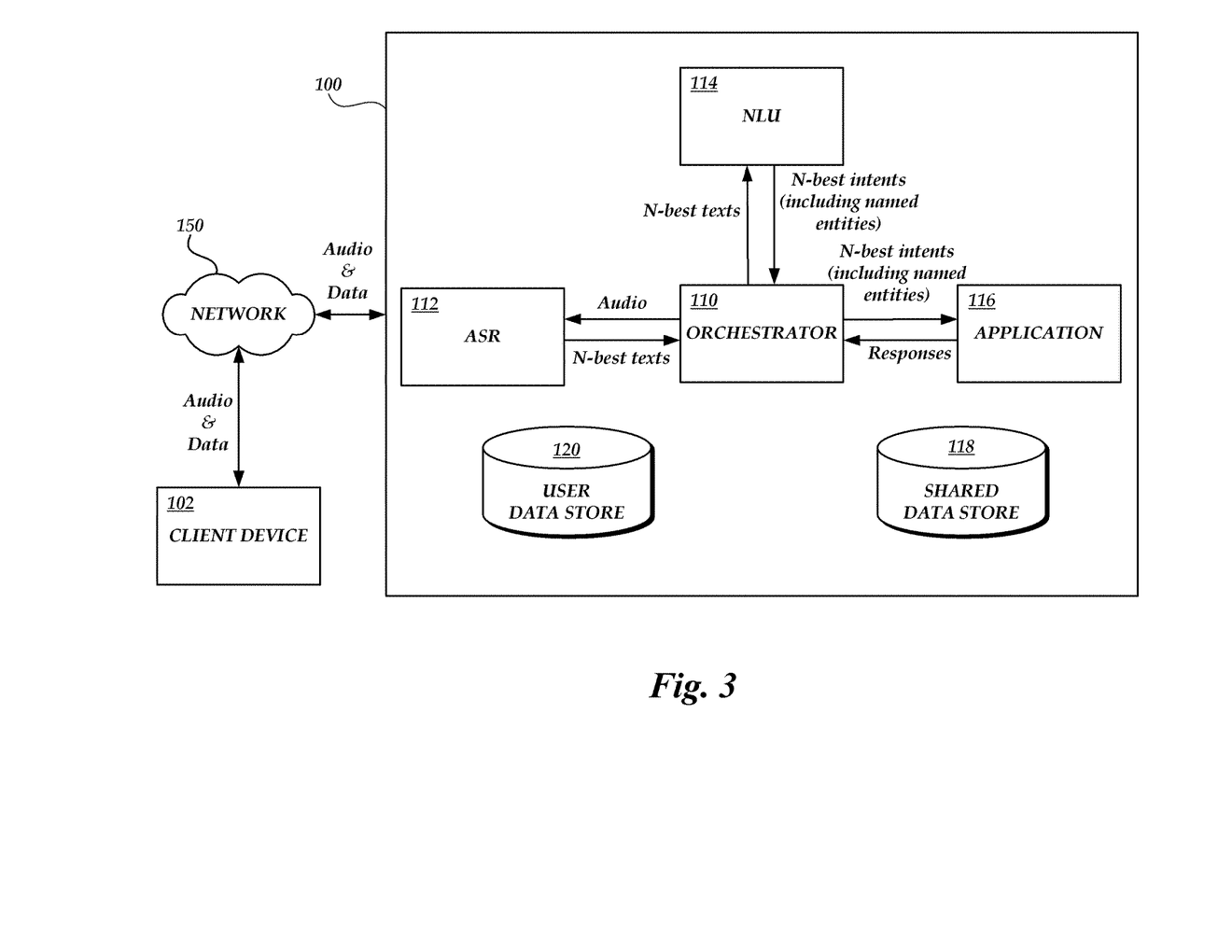
FIG. 3 is a block diagram of an illustrative spoken language processing system showing various modules and data stores.

Prior to describing embodiments of processes for analyzing related named entities in detail, an example environment in which the processes may be implemented will be described. FIG. 3 illustrates a spoken language processing system 100 and a client device 102. The spoken language processing system 100 can be a network-accessible system in communication with the client device 102 via a communication network 150, such as a cellular telephone network or the Internet. A user may use the client device 102 to submit utterances, receive information, and initiate various processes, either on the client device 102 or at the spoken language processing system 100. For example, the user can issue spoken commands to the client device 102 in order to get information about the weather or listen to music, as described above.

The client device 102 can correspond to a wide variety of electronic devices. In some embodiments, the client device 102 may be a mobile device that includes one or more processors and a memory which may contain software applications executed by the processors. The client device 102 may include a speaker or other audio output component for presenting or facilitating presentation of audio content. In addition, the client device 102 may contain a microphone or other audio input component for accepting speech input on which to perform speech recognition. Illustratively, the client device 102 may be a mobile phone, personal digital assistant ("PDA"), mobile gaming device, media player, electronic book reader, tablet computer, laptop computer, or the like. The software of the client device 102 may include components for establishing communications over wireless communication networks or directly with other computing devices.

The network 150 may be a publicly accessible network of linked networks, possibly operated by various distinct parties, such as the Internet. In other embodiments, the network 150 may include a private network, personal area network ("PAN"), LAN, WAN, cable network, satellite network, etc. or some combination thereof, each with access to and/or from the Internet. For example, the devices of the spoken language processing system 100 may be located within a single data center, and may communicate via a private network as described above. The client device 102 may communicate with spoken language processing system 100 via the Internet. The client device 102 may have access to the Internet via a wired or WiFi connection, or via a cellular telephone network (e.g., a Long Term Evolution or LTE network).

The spoken language processing system 100 can be any computing system that is configured to communicate via a communication network. For example, the spoken language processing system 100 may include any number of server computing devices, desktop computing devices, mainframe computers, and the like. In some embodiments, the spoken language processing system 100 can include several devices physically or logically grouped together, such as an application server computing device configured to perform speech recognition on an utterance and a database server computing device configured to store records and speech recognition models.

The spoken language processing system 100 can include an orchestrator module 110, an ASR module 112, an NLU module 114, one or more applications 116, a shared data store 118, and user data store 120. In some embodiments, the spoken language processing system 100 can include various modules and components combined on a single device, multiple instances of a single module or component, etc. For example, the spoken language processing system 100 may include a separate database server that may be configured with the shared data store 118 and user data store 120; a server configured to function as the orchestrator 110; a server or group of servers configured with both ASR and NLU modules 112, 114; and a server or group of servers configured with applications 116. In multi-device implementations, the various devices of the spoken language processing system 100 may communicate via an internal communication network, such as a corporate or university network configured as a local area network ("LAN") or a wide area network ("WAN"). In some cases, the devices of the spoken language processing system 100 may communicate over an external network, such as the Internet, or a combination of internal and external networks.

In some embodiments, the features and services provided by the spoken language processing system 100 may be implemented as web services consumable via a communication network 150. In further embodiments, the spoken language processing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In operation, a client device 102 may transmit audio data of user utterances to the spoken language processing system 100. In some embodiments, the client device 102 may also transmit data regarding the user, such as user characteristics that can be used to determine values for nonstandard terms that may differ depending on characteristics of the user (e.g., users in different geographic regions may use different terms when referring to carbonated soft drinks).

An orchestrator module 110 may be implemented at the spoken language processing system 100 to manage the data flows to and from the client device 102 and the various modules and data stores of spoken language processing system 100. For example, upon receipt of audio data from a client device 102, the orchestrator module 110 may provide the audio data to the ASR module 112. The ASR module 112 may process the audio data and generate an N-best list or lattice of texts.

The orchestrator 110 may then provide the N-best list to the NLU module 114. The NLU module 114 can process the N-best list to determine an interpretation, or an N-best list of interpretations, of the user utterance. If the NLU module 114 encounters a nonstandard term, the NLU module 114 may query the shared data store 118 or the user data store 120 to obtain a definition or value for the nonstandard term, as described in detail below. The NLU module 114 may query the data stores 118 and 120 directly, or the orchestrator 110 may serve as an intermediary for the NLU module 114 in order to shield the NLU module 114 from the details of data retrieval from data stores.

Although user data store 120 and shared data store 118 are shown as separate entities in FIG. 3, the data stores may be located on or managed by the same physical computing device. In addition, the user data store 120 and shared data store 118 may be implemented as separate data sets within a single data store, rather than separate data stores altogether. In some embodiments, the user data store 120 includes information for multiple users, identified so that information for an individual user may be located, while in some embodiments a different user data store 120 or data set may be maintained for each user individually or some subset of all users. The terms data store and data set, as used herein, can refer to any data storage unit or other collection of data, such as a knowledge base, relational database, catalog, file, etc.

The orchestrator 110 can provide the output from the NLU module 114 to an appropriate application 116 so that a response can be generated or an action can be performed.

In some embodiments, additional or fewer modules and data stores may be implemented in the spoken language processing system 100. For example, an orchestrator module 110 may not be implemented. Rather, the various modules and data stores of the spoken language processing system 100 may communicate directly with each other. As another example, the spoken language processing system 100 may include a TTS module that generates synthesized speech for playback on the client device 102. A natural language generation module ("NLG") may also be implemented generate data used by the TTS module during speech synthesis.

Process for Resolving Nonstandard Terms

Figure 4:
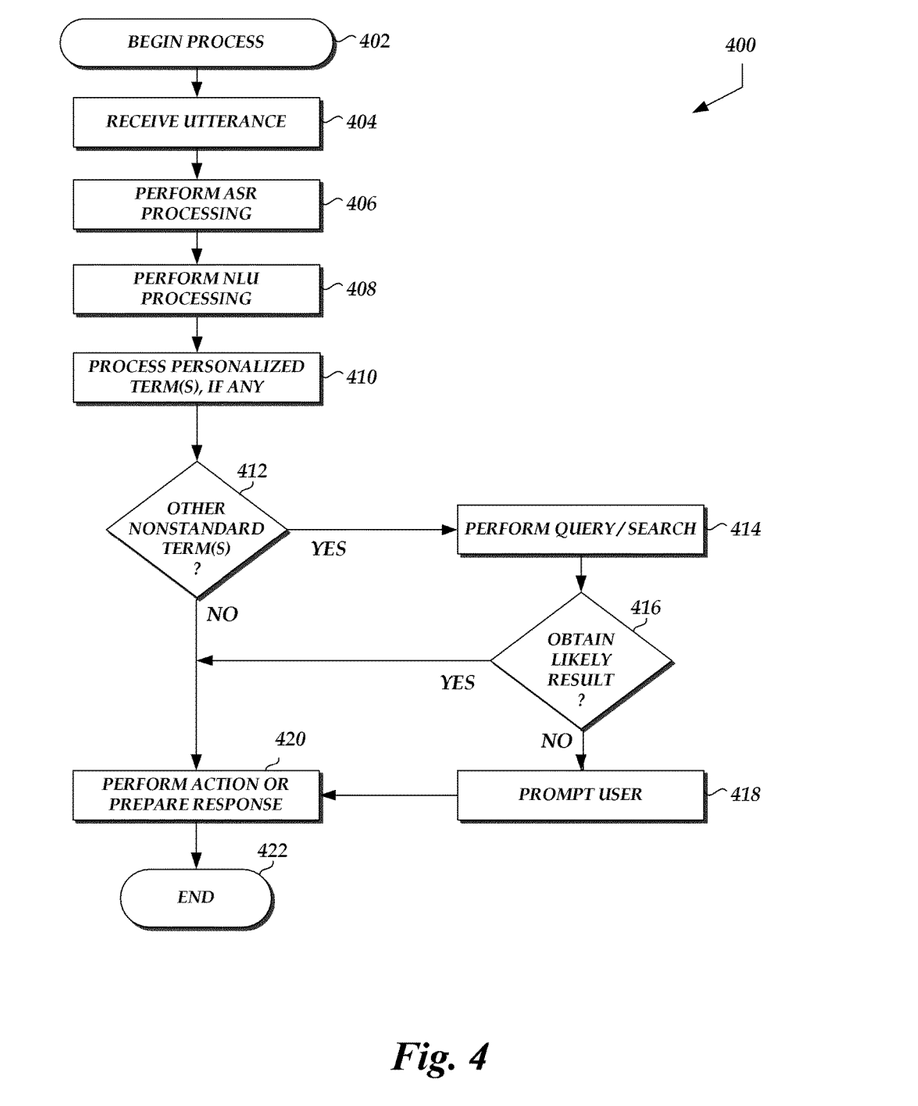
FIG. 4 is a flow diagram of an illustrative process for processing an utterance that contains nonstandard terminology.

With reference now to FIG. 4, a sample process 400 for processing a user utterance that includes nonstandard terms will be described. Advantageously, an NLU module 114 or some other module of a spoken language processing system 100 performing the process 400 can query data stores in order to determine definitions or values for nonstandard terms, thereby improving the performance of the system by avoiding invalid results or requiring user clarification each time a nonstandard term is encountered. When user a user definition or clarification is sought, the data provided by the user can be saved so that the user need not repeat the clarification in the future.

The process 400 begins at block 402. The process 400 may begin automatically upon initiation of a speech recognition session. The process 400 may be embodied in a set of executable program instructions stored on a computer-readable medium, such as one or more disk drives, of a computing system of the spoken language processing system 100. When the process 400 is initiated, the executable program instructions can be loaded into memory, such as RAM, and executed by one or more processors of the computing system.

At block 404, the spoken language processing system 100 can receive an utterance from a client device 102. For example, the client device may be a mobile phone, and the user utterance may be "Call my schnookums."

At block 406, the spoken language processing system 100 can perform speech recognition processing on the utterance. An ASR module 112 may utilize various models (e.g., language models, acoustic models) when determining the textual content of an utterance. The output of the ASR module 112 may be a lattice or N-best list of likely transcriptions of the user utterance. In some embodiments, rather than processing the utterance into textual transcriptions, the ASR module 112 may process the utterance into one or more phonemic transcriptions (e.g., the lattice or N-best list contains the utterance transcribed into a sequence of phonemes rather than text).

At block 408, the NLU module 114 can process the output of the ASR module 112 (or textual or phonemic data from some other source). In the present example, the NLU module 114 can process an N-best list from the ASR module 112 in order to determine an interpretation of the user's intent. A named entity recognizer or some other component of the NLU module 114 can identify named entities or other terms of particular importance to the interpretation of the user utterance. For example, the named entity recognizer may access a data store of known named entities in order to identify named entities in the ASR output or classify terms as particular named entities. The term "call" can indicate that the user intent is to initiate a call. Based on the structure of the text, the parts of speech of the words, and other data, the NLU module 114 may determine that the term "my schnookums" indicates the person or party to be called. Illustratively, the NLU module 114 may assign the value "my schnookums" to the "party" named entity of the "initiate a phone call" intent.

At block 410, NLU module 114 or some other component of the spoken language processing system 100 can determine whether a term identified as a particular named entity or as having a particular definition during NLU processing in block 408 is associated with some user-specific definition (e.g., an alias). If so, the user-specific alias may be associated with the term for subsequent processing, thereby overriding any standard or previously determined definition. For example, a particular term may be associated with a standard definition (e.g., "milk" may mean many different things, but, when used as a noun, it may be generally be understood to mean "cow's milk" or some specific variety of cow's milk). However, the current user may use the term to refer to something different (e.g., "soy milk"). The spoken language processing system 100 can determine at block 410 whether such a user-specific alias is associated with one of the terms identified in block 408, and override the standard definition with the user-specific alias. In some embodiments, user-specific aliases are obtained in parallel with standardized definitions in order to speed up processing. In some embodiments, user-specific aliases, if they exist, are obtained prior to and instead of standardized definitions.

At decision block 412, the spoken language processing system 100 can determine whether there are any other nonstandard terms (e.g., terms that do not have standard definitions or named entity classifications, or that are used in a nonstandard way) in the processed utterance. For example, in addition to personalized terms (e.g., recognized terms that have standard definitions overridden with personalized or customized definitions or aliases in block 410), there may be variable terms, unknown terms, and the like present in the processed utterance. Illustratively, if the NLU processing of block 408 results in identification of an unrecognized term (e.g., a made-up word), the process 400 can proceed from decision block 412 to block 414. Otherwise, the process 400 may proceed from decision block 412 to block 420, where an action is performed or a response is generated based on the interpreted user intent and resolved nonstandard terms. In the present example, the NLU module 114 may determine that the term "my schnookums" is a variable or unknown term when it is unable to resolve the term to determine the specific party to be called.

At block 414, the NLU module 114, an application 116, or some other component of the spoken language processing system 100 can query one or more data stores or search unstructured data in order to resolve the nonstandard term, as described in detail below with respect to FIG. 5. At decision block 416, if no likely result is found in the data stores, the user may be prompted at block 418 for a definition or information that may be used to create a definition. When values or definitions for any nonstandard terms in the interpretation have been obtained, the process 400 can proceed to block 420, where an action is performed or a response is generated based on the interpreted user intent and resolved nonstandard terms.

Figure 5:
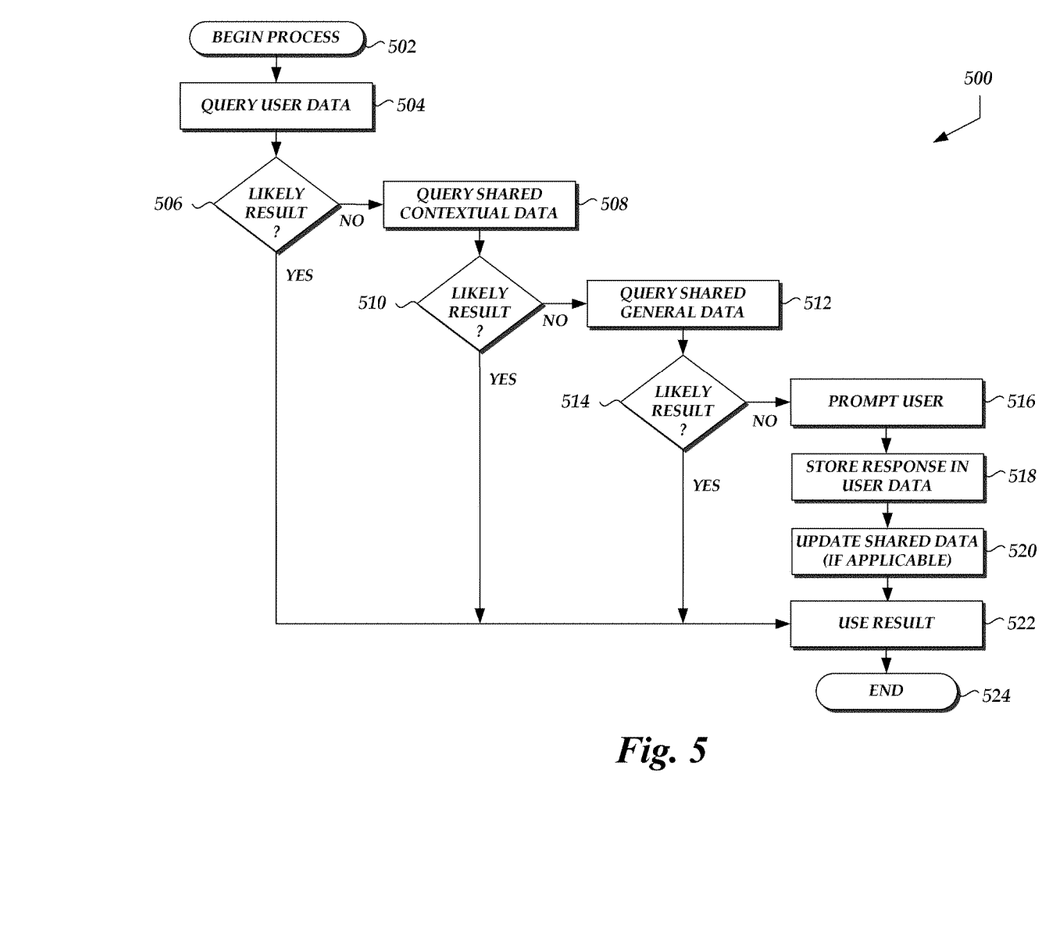
FIG. 5 is a flow diagram of an illustrative process for interpreting or defining nonstandard terminology.

FIG. 5 illustrates a sample process 500 for resolving nonstandard terms by obtaining a definition or value for the term in a data store, from a search of unstructured data, or from a user prompt. Advantageously, a systematic approach of querying user-specific data stores prior to general data stores, and for querying data stores prior to prompting a user for more information can help to reduce or eliminate inefficient processing or additional user interactions.

The process 500 begins at block 502. The process 500 may be performed in conjunction with the process 400, described above, or with any other process for resolving nonstandard terms. The process 500 may be embodied in a set of executable program instructions stored on a computer-readable medium, such as one or more disk drives, of a computing device associated with the spoken language processing system 100. When the process 500 is initiated, the executable program instructions can be loaded into memory, such as RAM, and executed by one or more processors of the computing system.

At block 504, a user data store 120 may be queried for a value or definition of the nonstandard term. Querying the user data store 120 prior to a shared data store 118 can be more efficient when the nonstandard term is a term that was made up by the user and therefore would not appear in the shared data store 118. In addition, definitions or values in the user data store 120 for a particular user may override definitions or values for the same nonstandard term that may be present in a shared data store 118. For example, different users may use the term "my schnookums" to refer to different people, such as a spouse, child, etc. By querying data associated with the current user, the definition or value that the user associates with the term can be used rather than a more general definition that may not apply to the user. In addition to querying a user data store 120, or as an alternative, unstructured user-specific data may be searched to determine a definition for a term. For example, a user's emails may be searched or otherwise analyzed, and an email to Jane Smith that begins with "Hi Schnookums" may be identified. Therefore, the term "schnookums" may relate to Jane Smith.

If no likely result is obtained from the user data store 120, the process 500 may proceed to block 508 where a shared data store 118 may be queried based on contextual data associated with the current request. For example, users in different geographic regions or users of different backgrounds may use a term differently. However, within a particular geographic region or background, the term may have a consistent meaning. Storing the values or definitions for such regional or group-affiliated terms in a shared data store 118 can be more efficient than storing the values in the user data store 120 for each individual user. The spoken language processing system 100 can use data regarding user characteristics that have been received from client devices 102 or obtained from a user data store 120 in order to determine which group or contextual definition to retrieve from the shared data store 118.

If no likely result is obtained from a shared data store 118 based on contextual data, the process 500 may proceed to block 512 where a search of other data stores and data sources of generally applicability may be performed. For example, an ontology or knowledge base of curated, structured data may be performed. As another example, unstructured data sources, such as information available on the Internet, may be searched (e.g., by using search engine techniques). Illustratively, a knowledge base or search engine may be queried to determine a likely definition for the word "schnookums." A top search result may indicate that "schnookums" refers to one's significant other. User-specific information (e.g., profiles, usage history, unstructured data, etc.) may then be searched or analyzed to determine the identity of the user's signification other. If no likely result is obtained through such a search, the process 500 may proceed to block 516, where the user is prompted for clarification (e.g., a definition of the nonstandard term).

At block, 518, the user's response to the prompt may be stored in the user data store 118. As a result, the next time the user makes an utterance that includes the nonstandard term, the definition or value provided by the user may be retrieved from the data store 118 and used, and the user need not be prompted again regarding the term. For example, the user may indicate a specific person to which the nonstandard term "schnookums" applies. A record associating the specific person with the nonstandard term can be stored. However, if the nonstandard term is a made-up term or a term without a standard spelling, it may be difficult to later find the record in the data store due to different spellings or slightly different pronunciations which and ASR module 112 is not configured to standardize (e.g., because the ASR module 112 has not been trained to recognize the term, because the term has no generally accepted pronunciation or spelling, etc.). In such cases, phoneme recognition may be performed on the term, and a phoneme sequence can be stored in the data store with the user-supplied definition. Subsequent queries for the term may be made based on the phoneme sequence identified by the ASR module 112, which can be more accurate in this situation.

At block 520, the spoken language processing system 100 can determine whether the user's definition should be stored in a shared data store 120. If a number of users exceeding a threshold have submitted the same or a substantially similar value for the nonstandard term, then the term may be more efficiently stored in the shared data store 118 where it will be available to use with utterances of other users. However, in some cases there may be multiple values for the nonstandard term, and the values may not be similar enough that they can be replaced by a single general value. In such cases, context-specific or characteristic-specific values for the nonstandard term may be defined and stored in the shared data store 118.

At block 522, the spoken language processing system 100 can use the result of the process described above (e.g., the definition obtained from a user specific data store, a knowledge base search, or from the user), to respond to the user utterance or otherwise perform some action. In the present example, the spoken language processing system 100 may have determined that the term "schnookums" refers to Jane Smith, and that the user would like to call Jane Smith. An application 116 or some other component associated with the spoken language processing system 100 can then take action, such as by causing initiation of a phone call to Jane Smith. In some embodiments, the result of the process described above (e.g., that "schnookums" is an alias for a significant other and vice versa; or, more specifically, that "schnookums" is an alias for "Jane Smith" for this particular user) can be stored in a data store. By storing the alias in a data store, such as a data store of known named entities, it may be accessed during future NLU processing without requiring performance of all of the steps described above to obtain the result again.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
   receive first data regarding a first utterance of a first user of a plurality of users;
   generate a transcription of the first utterance using an automatic speech recognition ("ASR") subsystem, the transcription comprising a plurality of terms;
   identify a first term of the plurality of terms as a named entity based at least partly on a part of speech of the first term and a co-occurrence in the first utterance of the first term and a second term, wherein the second term corresponds to an executable action, and wherein the executable action is to be executed based at least partly on the named entity;

determine, using a natural language understanding ("NLU") subsystem, that the named entity is a nonstandard named entity based at least partly on a definition of the named entity not being resolved to a threshold degree of confidence;

determine that the first term is not included as an alias for a different term in a first set of aliases stored in a user data store, wherein the first set of aliases stored in the user data store is personalized to the first user;

after determining that the first term is not included in the first set of aliases personalized for the first user, determine that the first term is not included in a second set of aliases stored in a shared data store, wherein the second set of aliases stored in the shared data store is common to the plurality of users; and after determining that the first term is not included in the first set of aliases personalized for the first user and is not included in the second set of aliases common to the plurality of users:
 analyze text-based communications of the first user to identify an occurrence of a third term;
 determine that the first term is an alias for the third term based at least partly on a context of the occurrence of the third term;
 include the first term as the alias for the third term in the first set of aliases; and
 execute the executable action in response to the utterance based at least partly on the first term.

2. The system of claim 1, wherein the first term comprises one of: a slang term, a user-created term, or a term comprising a value that varies depending at least partly on a user of the term.

3. The system of claim 1, wherein the one or more processors are further programmed by the executable instructions to:
 receive third data regarding a third utterance of a second user, the third utterance comprising the first term; and
 generate a response, based at least partly on the alias of the first term, to the third utterance.

4. A computer-implemented method comprising:
 under control of one or more computing devices configured with specific computer-executable instructions,
  receiving audio data representing a first utterance of a first user in a plurality of users;
  generating a transcription of the first utterance using automatic speech recognition and the audio data, wherein the transcription comprises a first plurality of terms;
  identifying a first term of the first plurality of terms as an intent that corresponds to an executable action;
  identifying a second term of the first plurality of terms as a named entity, wherein the executable action is to be executed based at least partly on the named entity, and wherein the second term is identified based at least partly on a part of speech of the second term and a co-occurrence of the second term with the first term in the transcription;
  determining that the second term is a nonstandard term based at least on a definition of the nonstandard term not being determined to a threshold degree of confidence;
  determining that the definition of the nonstandard term is not included in information personalized for the first user;
  after determining that the definition of the nonstandard term is not included in the information personalized for the first user, determining that the definition of the nonstandard term is not included in information common to the plurality of users;
  after determining that the definition of the nonstandard term is not included in the information common to the plurality of users:
   analyzing text-based communications of the first user for information regarding the nonstandard term;
   determining the definition of the nonstandard term, the definition based at least partly on a context of an occurrence of the nonstandard term in the text-based communications;
   storing definition data regarding the definition of the nonstandard term in a data store;
   receiving a representation of a second utterance of the first user, the representation of the second utterance comprising a second plurality of terms;
   identifying the nonstandard term in the second plurality of terms; and
   executing the executable action in response to the second utterance based at least partly on the definition data.

5. The computer-implemented method of claim 4, wherein the nonstandard term comprises one of: a known term used in a nonstandard context, or an unknown term.

6. The computer-implemented method of claim 4, further comprising:
 determining at least one of: a part of speech of the nonstandard term, or a category relating to the nonstandard term, wherein the category comprises a person, a place, or a thing.

7. The computer-implemented method of claim 4, wherein determining that the second term is the nonstandard term is further based at least partly on failing to locate the nonstandard term in a data store of named entities.

8. The computer-implemented method of claim 4, wherein determining that the second term is the nonstandard term is further based at least partly on failing to obtain a definition for the nonstandard term in response to a search of unstructured data.

9. The computer-implemented method of claim 4, wherein identifying the nonstandard term in the second plurality of terms comprises:
 querying the data store for the definition data associated with the nonstandard term, the definition data associated with the first user.

10. The computer-implemented method of claim 4, wherein storing the definition data comprises:
 generating a phonetic representation of the nonstandard term; and
 storing the phonetic representation.

11. The computer-implemented method of claim 10, wherein identifying the nonstandard term in the second plurality of terms comprises performing a query for the definition data, the query based at least partly on the phonetic representation.

12. The computer-implemented method of claim 4, further comprising:
 receiving a representation of a third utterance of a second user in the plurality of users, the representation of the third utterance comprising one or more terms;

identifying the nonstandard term in the one or more terms of the representation of the third utterance; and
generating a response to the third utterance based at least partly on the definition data.

13. The computer-implemented method of claim 12, wherein generating the response to the third utterance comprises:
querying the data store for the definition data associated with the nonstandard term.

14. The computer-implemented method of claim 4, wherein the plurality of users share one or more characteristics.

15. The computer-implemented method of claim 14, wherein the one or more characteristics comprises at least one of a geographic location, an age, an ethnicity, or a gender.

16. The computer-implemented method of claim 4, wherein storing definition data regarding the definition of the nonstandard term in the data store comprises:
determining that another definition of the nonstandard term is included in the information common to the plurality of users;
determining that the definition of the nonstandard term is dissimilar to the other definition of the nonstandard definition; and
storing the definition of the nonstandard term in the data store such that the data store comprises the definition of the nonstandard term and the other definition of the nonstandard term.

17. The computer-implemented method of claim 4, further comprising determining that the definition of the nonstandard term has been associated with the nonstandard term for a threshold number of multiple users in the plurality of users that based at least partly on the definition of the nonstandard term being generic to the plurality of users.

18. The computer-implemented method of claim 4, wherein:
the information personalized for the first user comprises at least one of a glossary of terms personalized for the first user or a set of definitions personalized for the first user; and
the information personalized for the first user is stored in a user-specific data store.

19. The computer-implemented method of claim 4, wherein:
the information common to the plurality of users comprises at least one of a glossary or dictionary of nonstandard terms commonly used by the plurality of users; and
the information common to the plurality of users is stored in a shared data store.

20. The computer-implemented method of claim 4, further comprising:
determining that the first term comprises a verb, wherein the identifying the first term as the intent corresponding to the executable action is based at least partly on the determining that the first term comprises the verb; and
determining that the second term comprises a noun, wherein the identifying the second term as the named identity is based at least partly on the determining that the second term comprises the noun.

21. The computer-implemented method of claim 4, wherein analyzing the text-based communications of the first user for information regarding the nonstandard term comprises analyzing at least one of: text messages or email messages.

22. The computer-implemented method of claim 4, wherein analyzing the text-based communications of the first user for information regarding the nonstandard term comprises:
analyzing a first text-based communication to identify an occurrence of the nonstandard term; and
determining that the occurrence of the non-standard term is associated with an addressee of the first text-based communication.

23. The computer-implemented method of claim 22, further comprising:
determining an identity of the addressee; and
determining that the nonstandard term refers to the identity of the addressee.

24. The computer-implemented method of claim 4, wherein executing the executable action comprises at least one of: initiating playback of music; generating a text-to-speech presentation representing a response to the second utterance; dialing a phone number; or initiating download of a file.

25. One or more non-transitory computer-readable media comprising executable code that, when executed, cause one or more computing devices to perform a process comprising:
receiving audio data representing a first utterance of a user of a plurality of users;
generating a transcription of the first utterance using automatic speech recognition and the audio data, the transcription comprising a first plurality of terms;
identifying a first term of the first plurality of terms as an intent that corresponds to an executable action;
identifying a second term of the first plurality of terms as a named entity, wherein the executable action is to be executed based at least partly on the named entity, and wherein the second term is identified based at least partly on a part of speech of the second term and a co-occurrence of the second term with the first term in the transcription;
determining that the second term is a nonstandard term based at least on a definition of the nonstandard term not being determined to a threshold degree of confidence;
determining that the definition of the nonstandard term is not included in information personalized for the user;
after determining that the definition of the nonstandard term is not included in the information personalized for the user:
analyzing text-based communications of the user for information regarding the nonstandard term;
determining the definition of the nonstandard term based at least partly on a context of an occurrence of the nonstandard term in the text-based communications;
storing definition data regarding the definition of the nonstandard term in a data store;
receiving a representation of a second utterance of the user, the second utterance comprising a second plurality of terms;
identifying the nonstandard term in the second plurality of terms; and
executing the executable action in response to the second utterance based at least partly on the definition data.

26. The one or more non-transitory computer-readable media of claim 25, wherein the process further comprises:
determining at least one of a part of speech or a category relating to the nonstandard term, wherein the category comprises a person, a place, or a thing.

27. The one or more non-transitory computer-readable media of claim 25, the process further comprising:

prompting the user for information regarding the nonstandard term, wherein prompting the user comprises one of: generating a visual display, or generating a text-to-speech presentation.

28. The one or more non-transitory computer-readable media of claim 25, wherein determining that the second term is the nonstandard term is further based at least partly on failing to locate the nonstandard term in a data store of named entities.

29. The one or more non-transitory computer-readable media of claim 25, wherein determining that the second term is the nonstandard term is further based at least partly on failing to obtain a definition for the nonstandard term in response to a search of unstructured data.

30. The one or more non-transitory computer-readable media of claim 25, wherein identifying the nonstandard term in the second plurality of terms comprises:

querying the data store comprising the information common to the plurality of users for the definition data associated with the nonstandard term.

31. The one or more non-transitory computer-readable media of claim 25, wherein storing the definition data comprises:

generating a phonetic representation of the nonstandard term; and storing the phonetic representation.

32. The one or more non-transitory computer-readable media of claim 31, wherein identifying the nonstandard term in the second plurality of terms comprises performing a query for the definition data, the query based at least partly on the phonetic representation.

* * * * *

UNITED STATES PATENT AND TRADEMARK OFFICE
CERTIFICATE OF CORRECTION

PATENT NO. : 10,102,845 B1
APPLICATION NO. : 13/776594
DATED : October 16, 2018
INVENTOR(S) : Weam Abu Zaki et al.

Page 1 of 1

It is certified that error appears in the above-identified patent and that said Letters Patent is hereby corrected as shown below:

In the Claims

In Column 17, Line 35, Claim 17, after "users" delete "that".

Signed and Sealed this
Twenty-eighth Day of May, 2019

Andrei Iancu
*Director of the United States Patent and Trademark Office*